United States Patent [19]

Kyri et al.

[11] 4,267,058
[45] May 12, 1981

[54] PRECIPITATING AGENT FOR DEPHOSPHATIZING EFFLUENT

[75] Inventors: Hans Kyri, Cologne; Jürgen Dobbers, Leverkusen, both of Fed. Rep. of Germany

[73] Assignee: Bayer Aktiengesellschaft, Leverkusen, Fed. Rep. of Germany

[21] Appl. No.: 77,227

[22] Filed: Sep. 20, 1979

[30] Foreign Application Priority Data

Oct. 3, 1978 [DE] Fed. Rep. of Germany ....... 2843053

[51] Int. Cl.³ .................................................. C02F 1/52
[52] U.S. Cl. .................................... 210/716; 210/724; 210/906
[58] Field of Search ............. 210/DIG. 29, 59, 51–53, 210/47, 37 R

[56] References Cited

U.S. PATENT DOCUMENTS

| | | | |
|---|---|---|---|
| 3,499,837 | 3/1970 | Jaunarajs | 210/59 |
| 3,655,552 | 4/1972 | Flock, Jr. et al. | 210/DIG. 29 |
| 3,827,984 | 8/1974 | Kawert | 210/DIG. 29 |
| 4,118,319 | 10/1978 | Miyanohara et al. | 210/51 |

OTHER PUBLICATIONS

Gleisberg D. et al., "Phosphate Precipitation in Municipal Effluent," Chem. Ing. Tech., vol. 45 (20), pp. 1225–1226, (1973).

*Primary Examiner*—Benoit Castel
*Attorney, Agent, or Firm*—Sprung, Felfe, Horn, Lynch & Kramer

[57] ABSTRACT

A precipitating agent for the dephosphatization of effluent comprising by weight about 5 to 75% of active iron (III) sulphate, about 25 to 95% of active iron (III) oxide and 0 to about 10% of anhydrous magnesium sulphate. Optionally, an alkaline constituent such as the oxide or hydroxide of calcium or magnesium may also be present and dephosphatization is effected at a pH of about 4.5 to about 8.5. Extremely low contents of residual phosphorous can be obtained in the filtrate, a precipitate containing iron and phosphorous settling out cleanly.

4 Claims, No Drawings

PRECIPITATING AGENT FOR DEPHOSPHATIZING EFFLUENT

This invention relates to a precipitating agent for dephosphatizing effluent and the preparation thereof.

Effluent, in particular communal effluent, contains a substantial proportion of dissolved phosphates and other nutrients which promote vigorous growth of algae in static or slow flowing water. This eutrophication of water may be prevented by eliminating the dissolved phosphates. The concentration of soluble phosphates in communal effluent is commonly in the range of from 10 to 30 ppm of phosphorus.

It is known that the soluble phosphate content in effluent may be very substantially reduced by precipitation using aluminum or iron salts. These precipitations are normally carried out at a pH of from 5.5 to 7.0 and give rise to flocculent, bulky precipitates which are very difficult to filter. The filter sludge normally has a solids content of from 1 to 3%, by weight.

The purified effluent has a phosphorus content of from 0.5 to 3 ppm of phosphorus, which is further reduced by dilution in the water into which it is discharged.

It is also known to eliminate phosphate by means of calcium hydroxide in the alkaline region, at a pH of above 9.5. This method results in lower final concentrations of phosphate in the effluent and also promotes subsequent neutralization of the effluent, e.g. by the introduction of carbon dioxide.

These known processes give rise to precipitates which do not settle easily and are difficult to filter. These filter sludges must be concentrated until they may be deposited having a solids content of about 30%. After-treatment of the sludges is therefore one of the most important economical factors in communal clarification plants.

In view of the great importance of eliminating phosphates from effluent, there is an urgent need for precipitating agents which are suitable for use and do not lead to added complications in the treatment of filter sludge.

It has now been found that a specially prepared mixture of iron(III) sulphate and iron(III) oxide is a particularly effective precipitating agent for phosphate ions.

The present invention therefore relates to a precipitating agent for the dephosphatisation of effluent containing about 5 to 75%, by weight, of active iron (III) sulphate, about 25 to 95% by weight, of active iron(III) oxide and, optionally 0 to about 10%, by weight, of anhydrous magnesium sulphate and, optionally, an alkaline constituent.

The present invention also relates to a process for the dephosphatization of effluent, which is characterized in that the effluent is treated with a precipitating agent containing about 5 to 75%, by weight of active iron (III) sulphate, about 25 to 95%, by weight of active iron (III) oxide and from 0 to about 10% by weight, of anhydrous magnesium sulphate and, optionally, an alkaline constituent at a pH of about 4.5 to 8.5.

The use of the above-mentioned precipitating agent mixture for the dephosphatization of effluent is also an object of the present invention.

According to a known process, iron(II) sulphate heptahydrate, a waste product of the preparation of titanium dioxide, is dehydrated to the monohydrate and then heated to temperatures above about 800° C. in a furnace with supply of oxygen, so that the iron(II) sulphate is decomposed into sulphur dioxide and iron(III) oxide. The residue normally contains less than about 6% of soluble sulphates and less than about 3% of iron(III) sulphate.

The proportion of soluble iron(III) sulphate in the burnt residue may be increased by lowering the temperature employed for the heat treatment. Although the concentration of iron(III) sulphate depends not only on the temperature, but also on the residence time in the furnace, various types of furnace may be adjusted to conditions at which the product of roasting has an iron-(III) sulphate content of from about 5 to 75%. It has been found that such an active product of roasting is an uncommonly effective precipitating agent for phosphate ions in aqueous solutions. When a roasted product containing, for example, 18.5% by weight, of iron(III) sulphate is stirred into an aqueous solution of sodium dihydrogen phosphate, the filtrate obtained has a phosphorus content of only 0.5 to 3 ppm. This corresponds to from about 80 to 95% of the calculated capacity, based on the iron(III) sulphate, if the proportion of iron to phosphorus in the precipitate is assumed to be 1.5:1.

According to the present invention, it is important to use an active precipitating agent mixture since, for example, a mixture of 75%, by weight, of iron(III) oxide of pigment quality and 25%, by weight, of commercial iron(III) sulphate is found in the same precipitation experiment to have a precipitating capacity of only from 30 to 40%, based on the quantity of iron(III) sulphate contained in the mixture. An incompletely roasted, active roast product is therefore preferably used in accordance with the present invention.

The active precipitating agent may also contain from 0 to about 10%, by weight, of anhydrous magnesium sulphate.

Dissolved iron(III) salts produce very finely divided and flocculent phosphate precipitates. It is surprisingly found that the same precipitation carried out using the roasted product mentioned above having an iron(III) sulphate content of 18.5%, by weight, produces a rapidly sedimenting precipitate. The filtered precipitate in the wet state has a solids content of about 30%, by weight, and may, for example, be stored without further after-treatment.

The precipitation is preferably carried out at a pH of about 5.5 to 8, most preferably about 6 to 7.5.

According to one embodiment of the present invention, the precipitating action of the present precipitating agent may be even further improved both in its capacity and in the low final concentration of phosphate obtained. To achieve this, an alkaline constituent, preferably calcium oxide or hydroxide or magnesium oxide or hydroxide must be introduced into the effluent together with the roasted product so that the pH is adjusted to about 4.5 to 8.5.

It is known that hydroxyl apatite may be precipitated from solutions containing phosphate by means of calcium hydroxide at a pH above 9.5. The optimum of this precipitation is at a pH of about 10.5. This embodiment of the process, however, surprisingly functions at its optimum at a pH of from 4.5 to 8.5, preferably from 6 to 7.5. The process enables final phosphorus levels of from 0.1 to 0.2 ppm to be obtained in the purified water if a quantity of iron(III) sulphate corresponding to the equivalent quantity of phosphate contained in the solution is added.

One great advantage of this embodiment of the present process is that the best effect is obtained at a pH which does not require neutralization of the treated effluent. It is surprisingly found that in the present process, substantial clarification of the purified water occurs by sedimentation so that no flocculating agent need be added.

Precipitation of the phosphate by means of the roasted mixture occurs as soon as the present precipitating agent is stirred into the solution containing the phosphate. If the solution is thoroughly mixed, precipitation is completed after a residence time of from about 15 to 45 minutes. The process of precipitation is virtually independent of the temperature.

The dephosphatization of aqueous solutions described above is not restricted to the ranges of concentration ocurring in communal effluent, but may also be applied, for example, to solutions which have relatively high phosphate contents.

The mixture according to the present invention of iron(III) oxide and iron(III) sulphate optionally containing magnesium sulphate may be prepared from various raw materials which, when activated, e.g. by roasting, yields both iron(III) oxide and iron(III) sulphate. The present precipitating agent and the preparation and use thereof are therefore not limited to the decomposition products of waste materials obtained from the manufacture of titanium dioxide. For example, a vigorously dried iron(II) sulphate heptahydrate may also be used according to the present invention, but must be to a large extent oxidized to the iron(III) state. The end products obtained from the desulphurization of flue gases by the dry process with iron(III) oxide may also be used for the purposes of the present invention.

The present invention will now be described in more detail with the aid of the following examples.

EXAMPLE 1 (Comparison Example)

Iron(II) sulphate heptahydrate was dehydrated by heating until it had a composition corresponding to $FeSO_4.H_2O$. The raw material used for this dehydration was an iron(II) sulphate heptahydrate obtained by purifying the solution formed from the decomposition of ilmenite in sulphuric acid.

The monohydrate was roasted by heating in a rotary furnace. The final roasting temperature was from 850° to 900° C. The material to be roasted was heated to the required temperature by burning elemental sulphur with excess air in the furnace chamber. Iron(II) sulphate was converted into sulphur dioxide and iron(III) oxide. Any magnesium sulphate present in the iron(II) sulphate was left in the roasted product as anhydrous magnesium sulphate.

The roasted product formed a fine grained, reddish-brown powder containing soluble salts and consisting almost completely of sulphates of non-ferrous metals, mainly sulphates of magnesium and to a slight extent of zinc.

This product of roasting had such a slight effect as adsorption and precipitating agent for the elimination of phosphate ions from effluent that its use for this purpose was out of the question.

EXAMPLE 2

An iron(II) sulphate monohydrate was roasted by the same process as in Example 1. The final temperature in the roasting furnace was from 650° to 700° C. The roasted product had a distinctly lighter reddish-brown color than that obtained in Example 1 and had a soluble iron sulphate content of from about 20 to 25%, by weight, of $Fe_2(SO_4)_3$. (By varying the final temperature and residence time in the furnace, this iron sulphate content may be adjusted to values of from 5 to 75%, by weight, of $Fe_2(SO_4)_3$).

When this roasted product containing about 20% $Fe_2(SO_4)_3$ was stirred into a phosphate-containing effluent, phosphate was eliminated to an extent of from 75 to 95% of the theoretical value possible for the amount of iron(III) sulphate present, if one assumes that the product of precipitation was the compound, $[Fe(OH)_2]_3.(PO_4)_2$.

EXAMPLE 3 (Comparison Example)

A mixture of anhydrous iron(III) sulphate and iron(III) oxide containing 25%, by weight, of iron(III) sulphate of pigment quality was prepared.

0.4 g of this mixture was added to 1000 ml of a solution containing 10 ppm of phosphorus at 20° C. and the solution was vigorously stirred. After a residence time of the precipitating agent of 30 minutes, the solution was filtered. The filtrate still contained 6.3 ppm of phosphorus. Since the precipitation capacity of the iron(III) sulphate contained in 0.4 g of mixture corresponded to 10 mg of phosphorus, the iron(III) sulphate was utilized only to an xtent of 37%.

The same treatment carried out using 0.8 g of the mixture on 1000 ml of a solution containing 10 ppm of phosphorus resulted in a residual phosphorus content of 1.7 ppm in the filtrate. Based on the iron(III) sulphate content, this corresponded to a utilization of 41.5%.

EXAMPLES 4, 5 and 6

An active roasted product containing 18.5%, by weight, of $Fe_2(SO_4)_3$ was stirred at 20° C. into water having a degree of hardness of 50° and a phosphate content corresponding to 10 ppm of phosphorus. After 30 minutes' stirring, the residual phosphate content in the filtrate was determined. The results are represented in the following Table.

|  | Example | | |
| --- | --- | --- | --- |
|  | 4 | 5 | 6 |
| Initial phosphorus content in ppm | 10 | 10 | 10 |
| roasted product g/l | 0.2 | 0.53 | 0.8 |
| Equivalent quantity $Fe^{III}:P$ = X:1 X | 0.58:1 | 1.5:1 | 2.3:1 |
| Proportion of theoretical quantity ($Fe^{III}:P$ = 1.5:1) in % | 39% | 100 | 155% |
| pH after precipitation | 6–7 | 6–7 | 6–7 |
| Residual phosphorus content in ppm P | 6.3 | 2.0 | 0.4 |

In the proportion $Fe^{III}:P=1.5:1$, the residual phosphorus content obtained was 2 ppm/P1, which is necessary for maintaining biological purification. The utilization of $Fe_2(SO_4)_3$ from the roasted product was 80%.

By increasing the quantity of precipitating agent to 155% of the theoretical amount, a sufficient end concentration of phosphate for reprecipitation was obtained.

EXAMPLES 7, 8 and 9

A roasted product containing 18.5%, by weight, of $Fe_2(SO_4)_3$ was stirred into water having a degree of hardness of 15° and a phosphate content corresponding to 30 ppm of phosphorus at 20° C. The residual phosphate content in the filtrate was determined after 30 minutes' stirring.

|  | Example | | |
| --- | --- | --- | --- |
|  | 7 | 8 | 9 |
| Initial phosphorus content in ppm of P | 30 | 30 | 30 |
| Roasted product g/l | 0.77 | 1.55 | 3.10 |
| Equivalent quantity $Fe^{III}$:P | 0.75 | 1.5:1 | 3.0:1 |
| Proportion of theoretical quantity ($Fe^{III}$:P = 1.5:1) in % | 50% | 100% | 200% |
| pH after precipitation | 6.5 | 6.2 | 4.3 |
| Residual phosphorus content in ppm | 13.5 | 6.2 | 0.9 |

When a ratio of $Fe^{III}$:P=1.5:1 was used, the phosphate precipitate amounted to 80% of the theoretical precipitation capacity of the iron(III) sulphate contained in the roasted product.

EXAMPLE 10

1000 ml of a strongly acid effluent from the production of phosphoric acid esters was oxidized using a 20% sodium hypochlorite solution until all the phosphorus compounds were in the form of phosphates. The effluent had a phosphate content corresponding to 440 ppm P.

22 g of roasted product containing 18.5%, by weight, of $Fe_2(SO_4)_3$, followed by milk of lime containing 2.5 g of $Ca(OH)_2$ were stirred into the oxidized effluent. If necessary, the effluent was adjusted to a pH of from 6 to 7 using acid or alkali.

After 15 minutes' stirring, the product was filtered and the phosphate content of the filtrate was determined. A residual phosphorus concentration of 1.6 ppm P was found in the filtrate. 75 g of wet filter sludge having a solids content of 33%, by weight, were formed.

EXAMPLES 11, 12, 13, 14, 15 and 16

A roasted product containing 18.5%, by weight, of iron(III) sulphate were stirred into water at 20° C. having a degree of hardness of 15° and a phosphate content corresponding to 10 ppm P or 30 ppm P. Milk of lime was then stirred into the liquid. The soluble phosphate content in the filtrate was determined after 30 minutes.

|  | Examples | | | | | |
| --- | --- | --- | --- | --- | --- | --- |
|  | 11 | 12 | 13 | 14 | 15 | 16 |
| Initial phosphorus content in ppm of P | 10 | 10 | 30 | 30 | 30 | 30 |
| Roasted product g/l | 0.5 | 0.4 | 1.2 | 1.55 | 1.0 | 1.0 |
| Equivalent quantity $Fe^{III}$:P | 1.5:1 | 1.2:1 | 1.2:1 | 1.5:1 | 1:1 | 1:1 |
| Amount of $Ca(OH)_2$ added in g/l | 0.15 | 0.13 | 0.30 | 0.08 | 0.2 | 0.4 |
| pH after precipitation | 7–8 | 7 | 6.7 | 7 | 7–8 | 6–7 |
| Residual content ppm P | 0.20 | 0.8 | 0.5 | 2.0 | 0.4–0.2 | 0.1 |

EXAMPLE 17

(a) A solution of 128 g of $FeCl_3.6H_2O$ in 1000 ml of water was stirred into 1000 ml of a solution of $NaH_2PO_4.2H_2O$ containing 10,000 ppm of P. Virtually no precipitation occurred owing to the low pH (pH=1). After the addition of 1200 ml of N NaOH solution, the mixture had a pH of 6. The precipitate which now formed was so bulky that the whole mixture solidified to a gel.

(b) The same phosphate solution containing 10,000 ppm P was diluted to 2000 ml, and to it were added 500 g of a solid mixture of iron(III) oxide and iron(III) sulphate containing 18.5%, by weight, of $Fe_2(SO_4)_3$. The mixture obtained after stirring had a pH of 1. This was adjusted to a pH of 6 by the addition of N NaOH solution. This required 550 ml of sodium hydroxide solution.

By the addition of 650 ml of water, the mixture was made up to the same volume as that used in the previous precipitation using iron(III) chloride. The resulting suspension was a thin liquid and deposited 1100 ml of sediment within 2 hours. During the same time, a sediment having a volume of 3100 ml was obtained from the precipitation using iron(III) chloride.

It will be appreciated that the instant specification and examples are set forth by way of illustration and not limitation, and that various modifications and changes may be made without departing from the spirit and scope of the present invention.

We claim:

1. A process for the dephosphatization of effluent, comprising mixing the effluent having a pH of about 4.5 to 8.5 with a precipitating agent consisting essentially of about 5 to 75% by weight of active iron (III) sulphate, about 25 to 95% by weight of active iron (III) oxide and 0 to about 10% by weight of anhydrous magnesium sulphate, the active iron (III) sulphate and active iron (III) oxide having been produced by supplying oxygen while roasting iron (II) sulphate for a time insufficient to remove all the sulphate but sufficient to stop at the desired sulphate content.

2. A process according to claim 1, wherein the mixing with precipitating agent is carried out at a pH of about 5.5 to 8.

3. A process according to claim 1, wherein the pH is adjusted by an alkaline constituent selected from the group consisting of calcium oxide, calcium hydroxide, magnesium oxide and magnesium hydroxide.

4. A process according to claim 3, wherein the mixing with precipitating agent is carried out at a pH of about 7 to 7.5.

* * * * *